United States Patent
Gross et al.

(10) Patent No.: US 6,616,089 B2
(45) Date of Patent: Sep. 9, 2003

(54) SYSTEM AND METHOD FOR DISPENSING ADHESIVE IMBALANCE CORRECTION WEIGHT

(75) Inventors: Peter L. Gross, Indianapolis, IN (US); Todd L. Eck, New Palestine, IN (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/107,930

(22) Filed: Mar. 28, 2002

(65) Prior Publication Data

US 2002/0152811 A1 Oct. 24, 2002

Related U.S. Application Data

(60) Provisional application No. 60/286,076, filed on Apr. 24, 2001.

(51) Int. Cl.$^7$ ............................ B65H 49/00; G01M 1/16
(52) U.S. Cl. ........................................ 242/562; 73/468
(58) Field of Search .................... 73/458, 468; 242/562

(56) References Cited

U.S. PATENT DOCUMENTS

| | | | |
|---|---|---|---|
| 2,029,132 A | 1/1936 | Skelton | |
| 2,640,727 A | 6/1953 | Kennedy | |
| 3,154,347 A | 10/1964 | Griffith | |
| 3,177,039 A | 4/1965 | Skidmore | |
| 3,273,941 A | 9/1966 | Skidmore | |
| 3,748,910 A | 7/1973 | Hofmann | |
| 3,786,850 A | 1/1974 | Turoczi, Jr. | |
| 3,905,648 A | 9/1975 | Skidmore | |
| 3,960,409 A | 6/1976 | Songer | |
| 4,300,803 A | 11/1981 | Chorosevic | |
| 4,379,596 A | 4/1983 | Green et al. | |
| 5,557,043 A | 9/1996 | Drechsler | |
| 5,831,152 A | 11/1998 | Rothamel | |
| 5,959,205 A | 9/1999 | Yamaya et al. | |

OTHER PUBLICATIONS 1 sheet with title "Mercedes Benz Mag Wts", (published on or before Oct. 11, 1999).
1 sheet with title "Adhesive Strip Weights" (published on or before Oct. 11, 1999).

*Primary Examiner*—Hezron Williams
*Assistant Examiner*—Tamiko Bellamy
(74) *Attorney, Agent, or Firm*—Barnes & Thornburg

(57) ABSTRACT

A system and method are disclosed for dispensing an amount of imbalance correction weight for attachment to a rotary element to reduce an imbalance in the rotary element. The imbalance correction weight includes a number of individual weights provided on a length of double-sided adhesive tape. A guide directs the imbalance correction weight through a channel provided by the guide toward a tape divider. A driver pulls a protective backing away from the tape causing the imbalance correction weight to move through the channel toward the tape divider. A sensor counts the individual weights that move past it. When the sensor has counted a desired number of individual weights, a controller instructs the driver to stop pulling on the protective backing thereby stopping movement of the imbalance correction weight and then instructs the tape divider to divide the tape to provide the amount of imbalance correction weight. A weight applicator automatically receives the amount of imbalance correction weight and is operable to attach it to the rotary element.

10 Claims, 8 Drawing Sheets

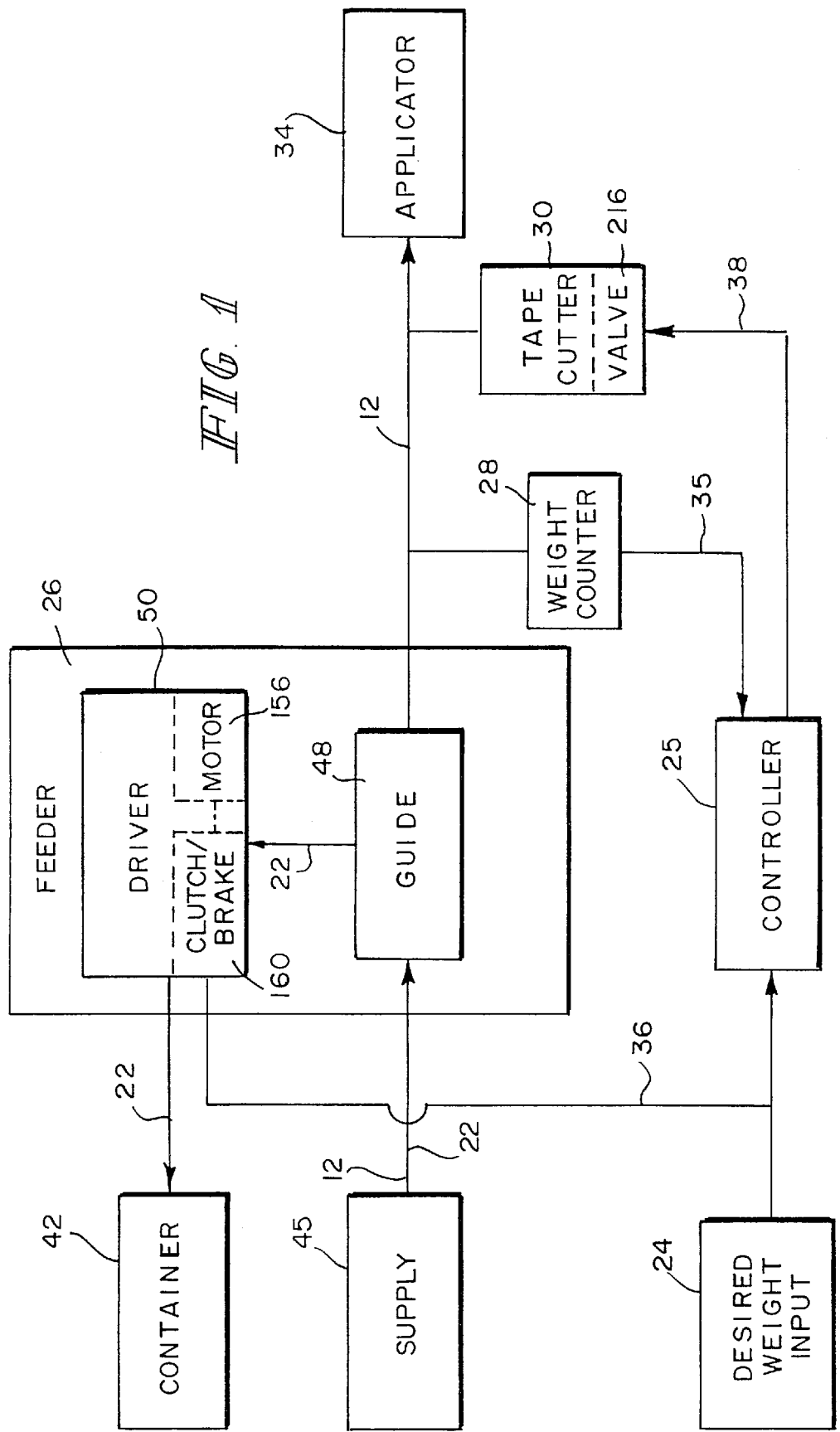

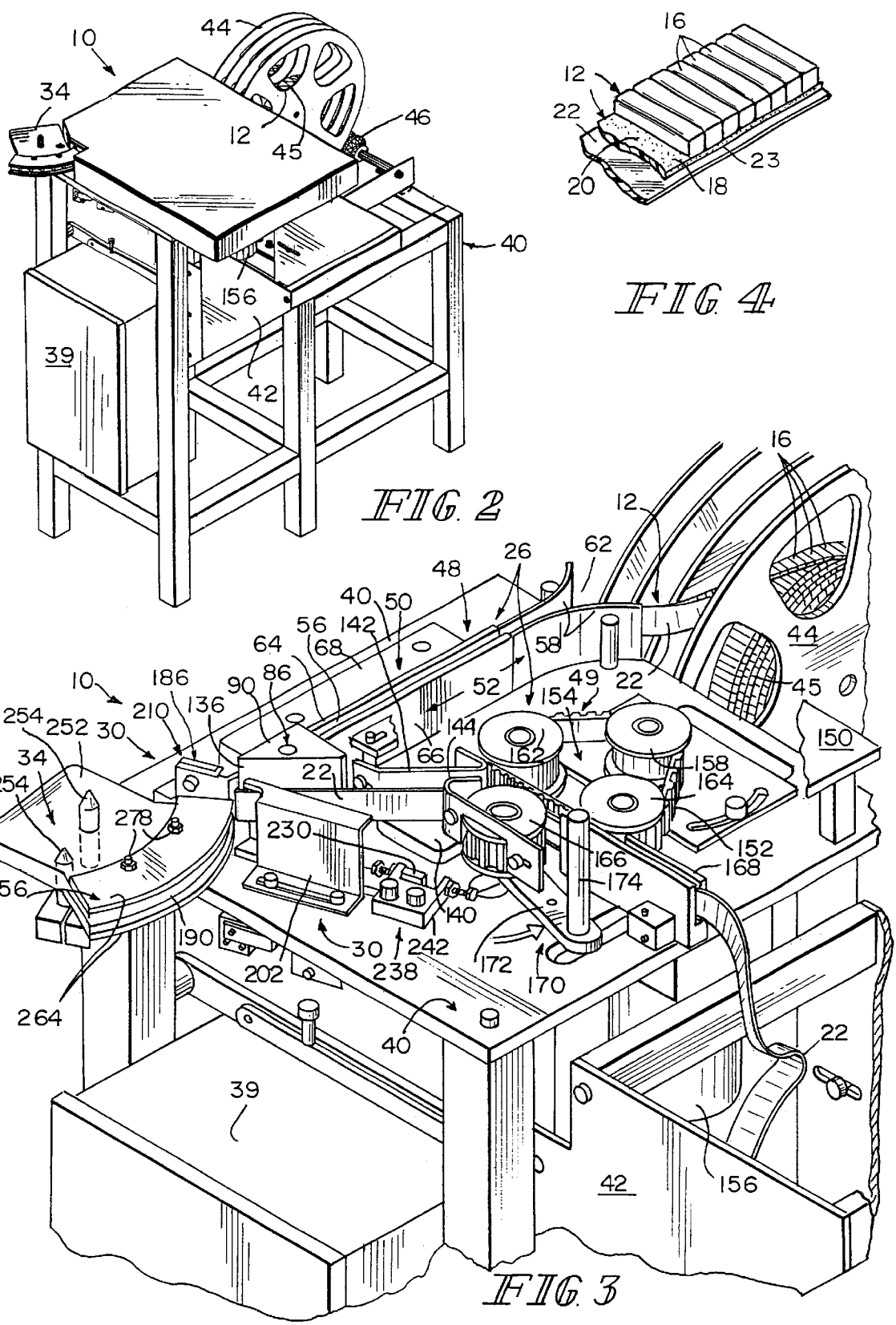

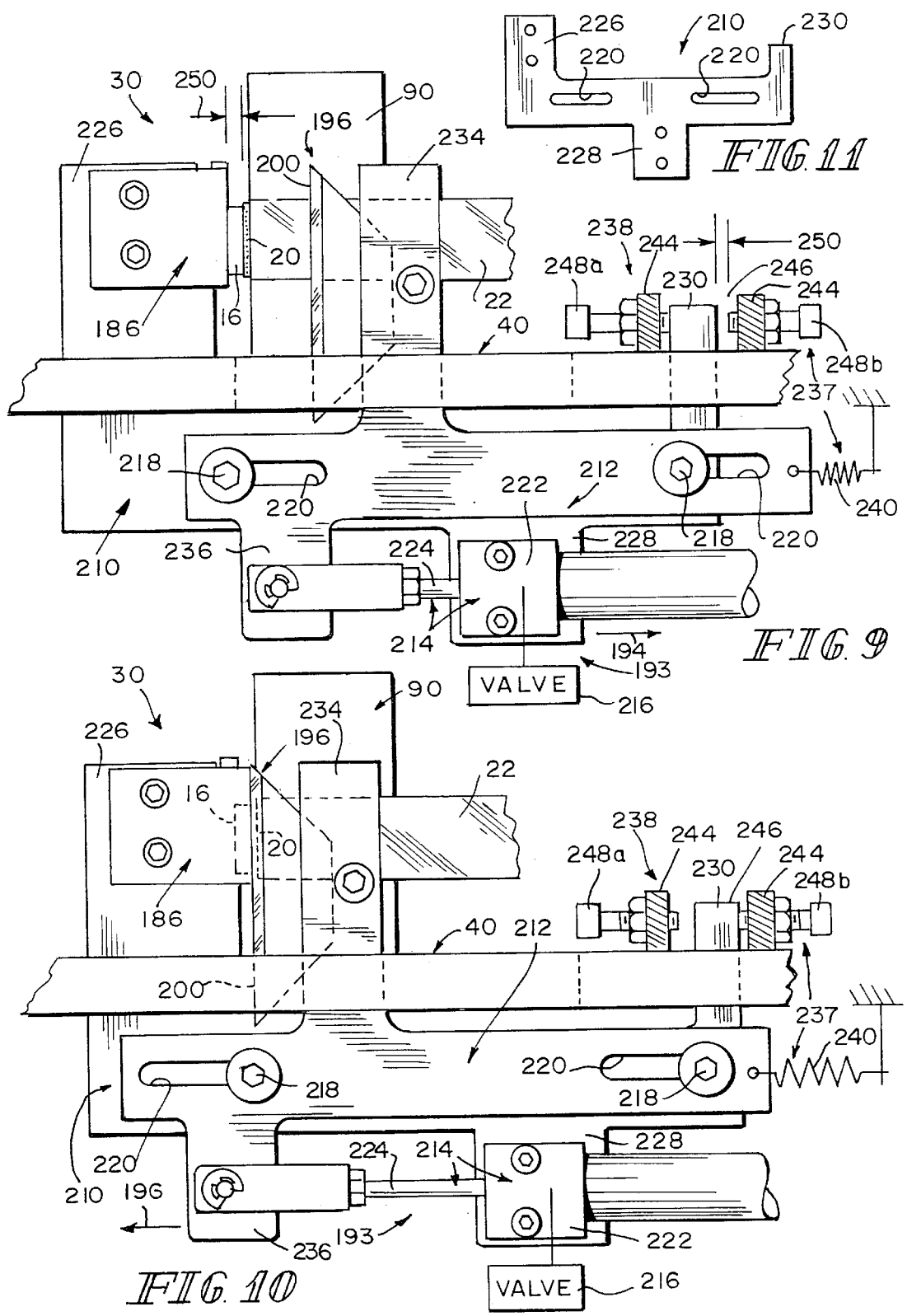

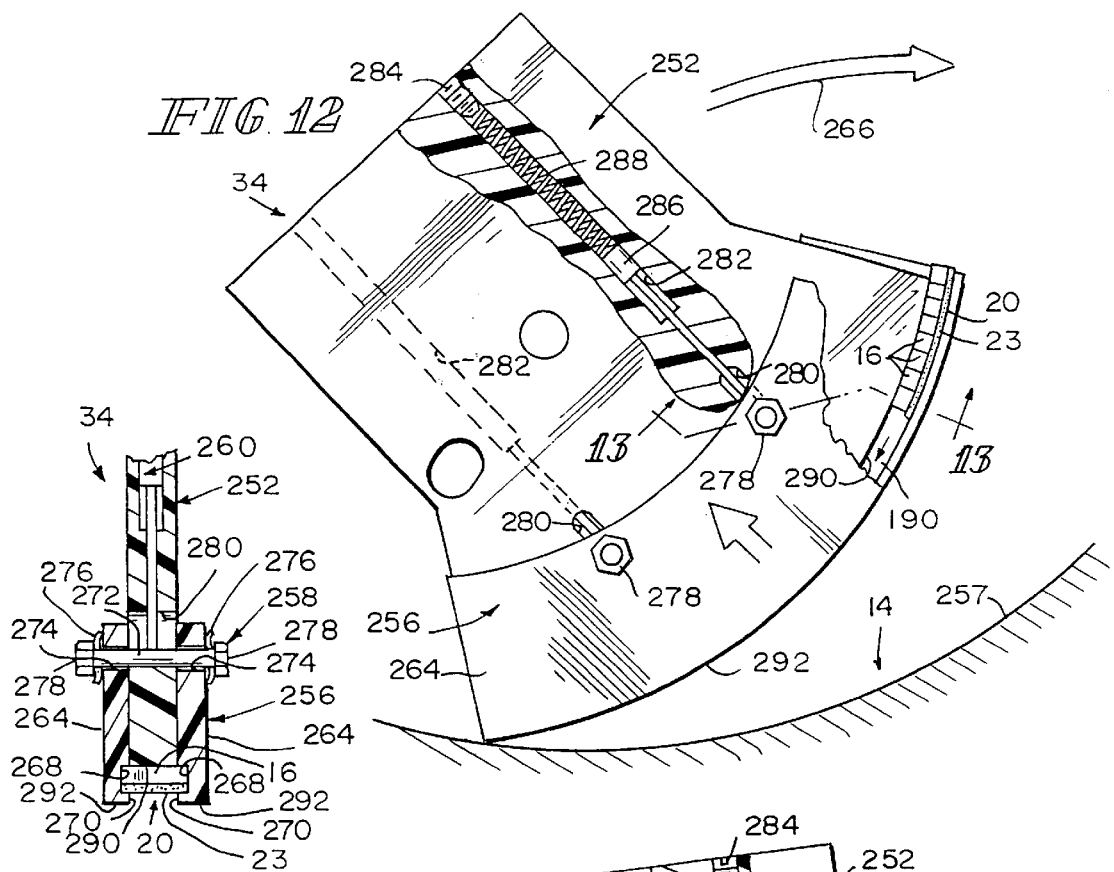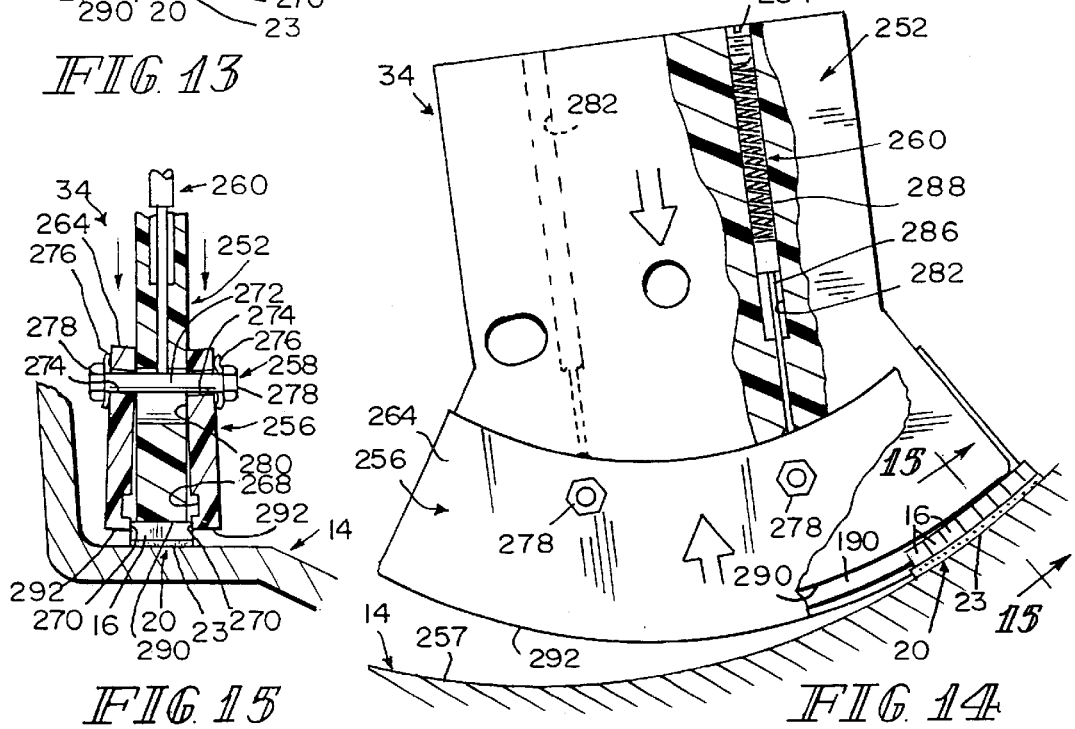

SYSTEM AND METHOD FOR DISPENSING ADHESIVE IMBALANCE CORRECTION WEIGHT

CROSS-REFERENCE TO RELATED APPLICATION

This application claims priority under 35 U.S.C. §119(e) to U. S. Provisional Application No. 60/286,076, filed Apr. 24, 2001, which is expressly incorporated by reference herein.

FIELD OF THE INVENTION

This invention relates to a system for dispensing adhesive imbalance correction weight for correcting imbalance in rotary elements. The invention is disclosed in the context of correcting imbalance in vehicle wheel-and-tire assemblies. The invention is believed to be useful in other applications as well.

BACKGROUND OF THE INVENTION

In recent years, some vehicle wheel designs have evolved that do not permit the use of pound-on imbalance correcting weights on the outwardly facing, or "curb" side of the wheel. These wheels are sometimes called "flangeless" or "soft face" wheels. Flangeless or soft face wheels generally require adhesive weights to be applied from the car side of the tire and wheel assembly to the inside diameter of the wheel to correct some portion of the imbalance in the assembly. Currently, an operator selects a specific size weight from a row of bins, removes the protective tape and applies the weight to the wheel. This process is slow and it is easy for the operator to select the wrong weight. In addition, typical currently available adhesive weights are made from pieces of lead with protective coatings to reduce the likelihood of direct worker contact with the lead. These one-piece weights are preformed to a specific wheel radius. Workers sometimes reshape the weights to the radius of a wheel for which the weights were not originally made. Otherwise, optimal adherence of the adhesive weight will not be achieved. These characteristics lead to additional work and rework at imbalance correcting stations for wheel and tire assemblies.

Another currently available system pulls extruded lead, with adhesive already applied, from a coil of extruded lead, forms the extruded lead to a particular radius, and then cuts the amount of extruded lead necessary to achieve a particular amount of imbalance correction. Weights formed using this system leave the ends of the lead weights exposed to contact with workers. This exposed lead is unacceptable to many manufacturers. Also, as noted, this system forms the extruded lead to only one radius. Again, this means that if the weight is to be applied to a wheel having another radius, the worker must reshape the weight to the desired curvature. Additionally, lead is heavy, resulting in the coils having limited capacity. This results in frequent replacement of the somewhat unwieldy coils.

SUMMARY OF THE INVENTION

According to several aspects of the invention, apparatus is provided for dispensing imbalance correction weight for attachment to a rotary element to reduce an imbalance in the rotary element. The imbalance correction weight includes one or more individual weights provided on a length of tape.

According to one of these aspects of the invention, the apparatus includes a blade and an anvil which cooperate to cut the tape, and a sequencer for sequencing relative movement of the blade and the anvil in a blade-moving stroke and an anvil-moving stroke, respectively.

Illustratively according to this aspect of the invention, the sequencer includes a spring for biasing the blade away from the anvil to sequence the anvil-moving stroke to occur before the blade-moving stroke.

Further illustratively according to this aspect of the invention, the apparatus includes a blade carriage carrying the blade, and an anvil carriage carrying the anvil. The blade carriage and the anvil carriage are mounted on a frame for relative movement.

Additionally illustratively according to this aspect of the invention, the sequencer includes a stop for engaging the anvil carriage to end the anvil-moving stroke.

Illustratively according to this aspect of the invention, the stop includes a first adjustable member for adjusting the excursion of the anvil during the anvil-moving stroke.

Further illustratively according to this aspect of the invention, the stop includes a second adjustable member engaging the anvil carriage to position the anvil before the anvil-moving stroke. The first adjustable member engages the anvil carriage to end the anvil-moving stroke.

Additionally illustratively according to this aspect of the invention, a motor is coupled to the blade carriage and the anvil carriage for moving the blade during the blade-moving stroke and the anvil during the anvil-moving stroke.

Illustratively according to this aspect of the invention, the motor includes a cylinder and a rod extensible from the cylinder in response to fluid flow. The cylinder is coupled to one of the anvil carriage and the blade carriage. The rod is coupled to the other of the anvil carriage and the blade carriage.

According to yet another aspect of the invention, the apparatus includes a tape divider for dividing the tape, and a sensor for counting individual weights. The tape divider divides the tape when the sensor has counted a number of individual weights necessary to reduce the imbalance.

Illustratively according to this aspect of the invention, the sensor is a photosensor.

Additionally illustratively according to this aspect of the invention, the sensor is positioned immediately upstream from a dividing zone in which the tape divider operates to divide the tape.

Further illustratively according to this aspect of the invention, the apparatus includes a guide for directing the imbalance correction weight toward the tape divider. The guide includes a wall and a bias mechanism for sequentially biasing one or more individual weights against the wall. The sensor is positioned to count a weight when the weight is biased against the wall by the bias mechanism.

Illustratively according to this aspect of the invention, the wall includes an opening. The sensor senses the weight through the opening.

Further illustratively according to this aspect of the invention, the guide includes a channel through which the imbalance correction weights pass on their way to the tape divider, and the sensor is positioned across the channel from the bias mechanism.

According to another aspect of the invention, the apparatus includes a tape divider for dividing the tape and a guide for directing the imbalance correction weight toward the tape divider. The guide includes a wall and a bias mechanism between which the imbalance correction weight is directed. The bias mechanism yieldably biases a portion of the imbalance correction weight against the wall.

Illustratively according to this aspect of the invention, the bias mechanism includes a body and a first bias element for yieldably biasing a portion of the body toward the wall to bias a portion of the imbalance correction weight against the wall.

Further illustratively according to this aspect of the invention, the apparatus including a frame. The body is mounted on the frame for pivotal movement in response to variations in the size of the individual weights and the compressibility of the tape.

Additionally illustratively according to this aspect of the invention, the bias mechanism includes a second bias element for yieldably biasing the portion of the body away from the wall to maintain a space between the body and the wall when no imbalance correction weight is between the body and the wall.

Illustratively according to this aspect of the invention, the first bias element exerts a force on the body of a first distance from a pivot axis of the body and the second bias element exerts a force on the body at a second distance from the pivot axis, the first distance being greater than the second distance.

Further illustratively according to this aspect of the invention, each of the first and second bias elements includes a plunger and a spring yieldably biasing the plunger against the body.

According to yet another aspect of the invention, the individual weights are provided on a first side of a length of tape, and a removable backing is provided on a second side of the tape. The apparatus includes a tape divider for dividing the tape and a driver for removing the backing from the second side to move the imbalance correction weight toward the tape divider.

Illustratively according to this aspect of the invention, the driver includes a wheel and a movable belt for pulling on a portion of the backing removed from the second side.

Further illustratively according to this aspect of the invention, the movable belt is trained about at least two pulleys.

Additionally illustratively according to this aspect of the invention, the portion of the backing removed from the second side passes between the wheel and the movable belt.

Further illustratively according to this aspect of the invention, the apparatus includes a motor coupled to a first one of the pulleys to drive the belt.

Illustratively according to this aspect of the invention, the driver includes a clutch-and-brake mechanism coupled to the motor and the first one of the pulleys.

Additionally illustratively according to this aspect of the invention, the apparatus includes a device for yieldably urging the wheel against the movable belt with the portion of the backing between the belt and the wheel.

Illustratively according to this aspect of the invention, the device includes a pivotal arm rotatably supporting the wheel and a spring coupled to the arm to bias the wheel toward the belt.

According to several other aspects of the invention, methods are provided for dispensing imbalance correction weight for attachment to a rotary element to reduce an imbalance in the rotary element. The imbalance correction weight includes one or more individual weights provided on a length of tape.

According to one of these aspects of the invention, each individual weight has an outer surface covered by a coating. The method includes dividing the tape while maintaining the coating on the individual weights to provide the imbalance correction weight.

Illustratively according to this aspect of the invention, dividing the tape to provide the amount of imbalance correction weight includes moving a blade and an anvil relative to the tape so that the blade and anvil cooperate to divide the tape.

Further illustratively according to this aspect of the invention, the method includes providing a gap between the pair of adjacent individual weights. Moving a blade and an anvil relative to the tape so that the blade and anvil cooperate to divide the tape includes moving the anvil between a pair of adjacent individual weights into contact with a first side of the tape. Moving the anvil between a pair of adjacent individual weights into contact with a first side of the tape includes moving the anvil into the gap.

Additionally illustratively according to this aspect of the invention, moving a blade and an anvil relative to the tape so that the blade and anvil cooperate to divide the tape includes moving the blade into contact with a second side of the tape after moving the anvil between the pair of adjacent individual weights into contact with the first side of the tape.

Illustratively according to this aspect of the invention, providing a gap includes changing a direction of motion of the tape to open up the gap between adjacent individual weights.

Further illustratively according to this aspect of the invention, moving a blade and an anvil relative to the tape so that the blade and anvil cooperate to divide the tape includes yieldably biasing the blade against movement toward the tape.

Additionally illustratively according to this aspect of the invention, moving the anvil into the gap and the blade toward the anvil to divide the tape includes moving the anvil and the blade along paths that form oblique angles with a direction of motion of the imbalance correction weight prior to the change in the direction of motion of the imbalance correction weight.

Illustratively according to this aspect of the invention, moving the anvil into the gap and the blade toward the anvil to divide the tape includes moving the anvil into contact with at least one of the adjacent individual weights to widen the gap.

According to a further aspect of the invention, the method includes counting a desired number of individual weights, and dividing the tape when the desired number of individual weights has been counted to provide the amount of imbalance correction weight.

Illustratively according to this aspect of the invention, the method includes biasing the desired number of individual weights toward a sensor that counts the desired number of individual weights.

Further illustratively according to this aspect of the invention, counting the desired number of individual weights includes counting the desired number of weights using a photosensor.

Additionally illustratively according to this aspect of the invention, counting the desired number of individual weights includes counting the individual weight next adjacent the desired number of individual weights.

According to another aspect of the invention, the method includes moving the imbalance correction weight through a guide including a wall, yieldably biasing a portion of the imbalance correction weight against the wall, and dividing the tape to provide the amount of imbalance correction weight.

Illustratively according to this aspect of the invention, yieldably biasing a portion of the imbalance correction weight against the wall includes sequentially biasing one or more individual weights against the wall adjacent an outlet of the guide.

According to another aspect of the invention, the individual weights are provided on a first side of a length of tape. A removable backing is provided on a second side of the tape. The method includes removing the backing from a portion of the second side, moving the imbalance correction weight toward a tape divider in response to removing the backing from the portion of the second side, and dividing the tape at the tape divider to provide the amount of imbalance correction weight.

Illustratively according to this aspect of the invention, removing the backing from a portion of the second side includes moving a portion of the backing already removed from the second side and the tape from which the backing has been removed in different directions.

Additionally illustratively according to this aspect of the invention, removing the backing from a portion of the second side includes pulling on a portion of the backing previously removed from the second side.

Illustratively according to this aspect of the invention, pulling on a portion of the backing previously removed from the second side includes passing the portion of the backing previously removed from the second side between a movable belt and a wheel.

Further illustratively according to this aspect of the invention, the method includes directing the backing removed from the second side from between the belt and the wheel into a collection container.

According to another aspect of the invention, an apparatus is provided for attaching an imbalance correction weight to a rotary element to reduce an imbalance in the rotary element. The imbalance correction weight includes one or more individual weights provided on a first side of a length of tape. The tape includes a second side for attachment to the rotary element. The apparatus includes a body including a first surface for pressing the second side against the rotary element, and a clamp including a pair of jaws providing a channel. The jaws are movable relative to the body between extended orientations in which the channel is beyond the first surface and retracted orientations in which the channel is not beyond the first surface.

Illustratively according to this aspect of the invention, each jaw includes a convex second surface for contacting the rotary element to move the imbalance correction weight out of the channel.

Further illustratively according to this aspect of the invention, the first surface includes a convex surface.

Additionally illustratively according to this aspect of the invention, the channel includes a groove defined in each jaw.

Illustratively according to this aspect of the invention, each groove is bounded on one side by a flange. The flanges facing each other. The flanges cooperate to hold the weight yieldably when the jaws are in the retracted orientation.

Further illustratively according to this aspect of the invention, the clamp includes a bias mechanism for yieldably biasing the jaws toward each other.

Additionally illustratively according to this aspect of the invention, one of the body and the jaws includes at least one slot. The other of the body and the jaws includes at least one aperture. At least one connector extends through the aligned slot or slots and aperture or apertures. At least one spring is oriented on the connector or connectors and between the body and the jaws.

Further illustratively according to this aspect of the invention, the apparatus includes a bias mechanism for yieldably biasing the jaws toward their extended orientations.

Illustratively according to this aspect of the invention, the body includes at least one bore. The bias mechanism includes a plunger and a spring yieldably urging the plunger from the at least one bore and the plunger is coupled to the clamp.

According to another aspect of the invention, a method is provided for attaching an imbalance correction weight to a rotary element to reduce an imbalance in the rotary element. The imbalance correction weight including one or more individual weights provided on a first side of a length of tape. The tape includes a second side for attachment to the rotary element. The method includes holding the imbalance correction weight by a clamp, pressing the clamp against the rotary element, and releasing the imbalance correction weight from the clamp in contact with the rotary element.

Illustratively according to this aspect of the invention, holding the imbalance correction weight by a clamp includes providing a channel in the clamp and positioning at least a portion of the imbalance correction weight in the channel.

Further illustratively according to this aspect of the invention, pressing the clamp against the rotary element and releasing the imbalance correction weight from the clamp together include moving the at least a portion of the imbalance correction weight outside the channel.

Additionally illustratively according to this aspect of the invention, pressing the clamp against the rotary element and releasing the imbalance correction weight from the clamp together include retracting a pair of jaws of the clamp with respect to a body provided for pressing the imbalance correction weight against the rotary element.

Illustratively according to this aspect of the invention, retracting a pair of jaws of the clamp with respect to a body provided for pressing the imbalance correction weight against the rotary element includes moving the jaws away from one another.

Further illustratively according to this aspect of the invention, releasing the imbalance correction weight from the clamp includes moving the imbalance correction weight out of grooves formed in the jaws. The grooves face each other. The imbalance correction weight moves to a position outside the grooves in which the jaws cooperate to hold the imbalance correction weight.

Additionally illustratively according to this aspect of the invention, pressing the clamp against the rotary element and releasing the imbalance correction weight from the clamp together include rolling the clamp against the rotary element.

Illustratively according to this aspect of the invention, rolling the clamp against the rotary element includes rolling a convex surface of the clamp against a concave surface of the rotary element which has a radius of curvature greater than a radius of curvature of the convex surface of the clamp.

Further illustratively according to this aspect of the invention, holding the imbalance correction weight by a clamp includes holding the imbalance correction weight by a pair of jaws of the clamp. Each jaw includes a convex surface. Rolling a convex surface of the clamp against a concave surface of the rotary element which has a radius of curvature greater than a radius of curvature of the convex surface of the clamp includes rolling the convex surfaces of the jaws against the concave surface of the rotary element.

BRIEF DESCRIPTION OF THE DRAWINGS

The invention may best be understood by referring to the following detailed description and accompanying drawings which illustrate the invention. In the drawings:

FIG. 1 illustrates a block diagram of a weight dispenser, applicator, control system and method for dispensing and applying a desired amount of imbalance correcting weight to a rotary element, the imbalance of which has been determined;

FIG. 2 illustrates a perspective view of the weight dispenser system illustrated in FIG. 1;

FIG. 3 illustrates an enlarged fragmentary perspective view of the weight dispenser system illustrated in FIGS. 1–2;

FIG. 4 illustrates an enlarged fragmentary perspective view of an amount of imbalance correcting weight in the form of individual weights on an adhesive backing;

FIG. 9 illustrates a fragmentary elevation view of components of the apparatus illustrated in FIGS. 3 and 5–8 in a first orientation;

FIG. 10 illustrates a fragmentary elevation view of components of the apparatus illustrated in FIGS. 3 and 5–9 in a second orientation;

FIG. 11 illustrates an elevation view of a detail of the components illustrated in FIGS. 3 and 5–10;

FIG. 12 illustrates an enlarged fragmentary top plan view of certain details of the components illustrated in FIGS. 2, 3, 5, 7 and 8 in a first orientation;

FIG. 13 illustrates an enlarged fragmentary view taken along section lines 13—13 of FIG. 12;

FIG. 14 illustrates an enlarged fragmentary top plan view of certain details of the components illustrated in FIGS. 2, 3, 5, 7, 8, 12 and 13 in a second orientation; and, FIG. 15 illustrates an enlarged fragmentary view taken along section lines 15—15 of FIG. 14.

DETAILED DESCRIPTION OF AN ILLUSTRATIVE EMBODIMENT

Figure 5:
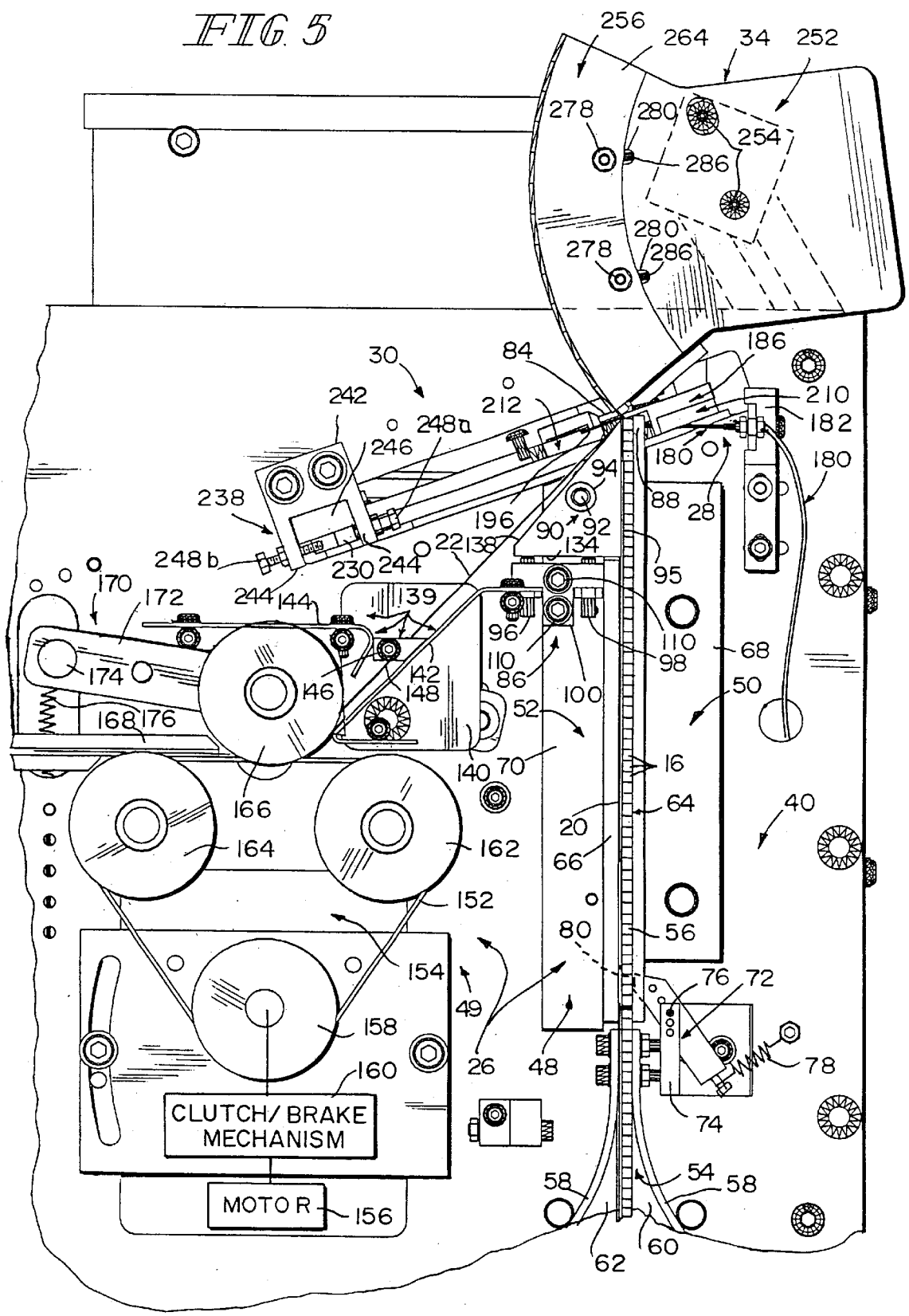
FIG. 5 illustrates a fragmentary top plan view of components of the weight dispenser system illustrated in FIG. 3.

Referring generally to the drawings, a weight dispenser system 10 (FIG. 2) dispenses a selected amount of imbalance correcting weight 12 (FIG. 4). The selected amount is sufficient to cure substantially an imbalance in a rotary element 14, such as a vehicle wheel-and-tire assembly (FIGS. 12, 14 and 15). Weight 12 includes individual imbalance correcting weights 16 provided on a first adhesive side 18 of a length of double-sided adhesive tape 20. A removable protective backing 22, such as a thin film, is provided on a second adhesive side 23 of tape 20 to protect side 23 from contamination before weight 12 is dispensed. Weights 16 are oriented on first side 18 of tape 20 in side-by-side, intimate contact with adjacent weights 16 and are of substantially uniform configuration and weight. Each weight 16 is generally right rectangular prism-shaped and has a protective coating covering its entire outer surface to avoid exposure of workers to the material, for example, lead, from which the weights 16 are made. Tape 20 is elastic to accommodate a variety of radii of curvature of rotary elements.

As illustrated diagrammatically in FIG. 1, system 10 automatically dispenses the desired amount of weight 12 based on a desired weight input 24 from an imbalance measuring machine or an operator. Input 24 is the number of individual weights 16 to be dispensed by system 10. A controller 25 uses input 24 to control operation of system 10. A feeder 26 of system 10 pulls on backing 22 to remove it from side 23. The removal of backing 22 causes weight 12 to advance past a weight sensor 28 of system 10 and a tape divider 30 of system 10. Weight sensor 28 counts the individual weights 16 moving past it and sends a counter signal 35 indicative thereof to controller 25. Controller 25 uses this counter signal 35 to determine when to instruct feeder 26 by a feeder signal 36 to stop movement of weight 12 and to instruct divider 30 by a divider signal 38 to cut tape 20. Divider 30 cuts or otherwise divides tape 20 in a manner that maintains the protective coating on the individual weights 16 sufficiently intact to avoid exposure of the material of the individual weights 16. As weight 12 advances through system 12, the desired amount of weight 12 automatically enters a weight applicator 34 for application to the imbalanced rotary element 14. Illustratively, controller 25 is a programmable logic controller and is housed in a box 39 illustrated in part in FIG. 3. An on/off switch 31 is coupled to controller 25 to switch system 10 on and off.

A frame 40 (FIGS. 2–3) of system 10 supports feeder 26, sensor 28, tape divider 30, applicator 34, box 39, and a collection container 42 for backing 22. A reel 44 containing a supply 45 of weight 12 with backing 22 is mounted for rotation on one or more rollers 46 of frame 40 as weight 12 and backing 22 are pulled off reel 44.

Feeder 26 includes a guide 48 and a backing remover or driver 50, as illustrated in FIGS. 3 and 5. As weight 12 and backing 22 are dispensed from reel 44, guide 48 orients weight 12 and backing 22 so that the longitudinal axes of the individual weights 16 are in a vertical orientation. Guide 48 directs weight 12 and backing 22 toward tape divider 30 as driver 49 pulls backing 22 from weight 12 and advances weight 12 past sensor 28, divider 30, and into applicator 34. Guide 48 also positions a portion of weight 12 in a desired orientation just before that portion is presented to divider 30 so that divider 30 can cut tape 20 efficiently.

Guide 48 includes first 50 and second 52 sides between which weight 12 and backing 22 are fed, as illustrated in FIGS. 3 and 5. Guide 48 further includes a bottom wall 54 between first 50 and second 52 sides. Sides 50, 52 and bottom wall 54 cooperate to provide a channel 56 through which weight 12 and backing 22 pass. Each of sides 50, 52 includes a curved side wall 58 that cooperates with an entry ramp 60 of bottom wall 54 to provide an inlet 62 for introducing weight 12 and backing 22 into channel 56. After passing through inlet 62, weight 12 and backing 22 become sandwiched between a first side wall 64 of first side 50 and a second side wall 66 of second side 52 as they slide on bottom wall 54. First 68 and second 70 side wall supports support first 64 and second 66 side walls in properly spaced, generally vertical orientations.

First side wall 64 includes a slot (not shown) for a stopper 72 which prevents weight 12 and backing 22 from falling out of channel 56 back toward reel 44 when tape 20 is cut, as illustrated in FIG. 5. Stopper 72 is pivotally coupled to a mount 74 by a pivot pin 76 and is spring-biased into engagement with weights 16 by a spring 78. Stopper 72 includes a leading edge 80 that slides over weights 16 and into the small gaps between adjacent weights 16. When tape 20 is cut, weight 12 and backing 22 may retract slightly toward reel 44, but, because spring 78 biases leading edge 80 against weights 16, weight 12 and backing 22 are stopped from further retraction when edge 80 enters one of the small gaps between adjacent weights 16.

The sizes of individual weights 16 and the compressibility of tape 20 and backing 22 may vary slightly along the length of weight 12. This variance could create some undesirable slack in tape 20 when it reaches a dividing zone 84 (see FIGS. 7 and 8) where divider 30 cuts tape 20. Divider 30 may cut tape 20 less efficiently if it encounters such slack in tape 20. To minimize this slack in dividing zone 84, second side 52 includes a bias mechanism 86 positioned immediately "downstream" from second side wall 66 and across from a downstream end portion 88 of first side wall 64, as illustrated in FIGS. 5–8. Bias mechanism 86 yieldably biases the individual weights 16 that pass it, in sequence, against end portion 88 just before they exit channel 56 and enter dividing zone 84. The particular weight(s) 16 so biased at any given time is (are) sometimes referred to hereinafter as the "biased weight(s) 16a." Bias mechanism 86 presses against backing 22 to push biased weight(s) 16a against end portion 88. Bias mechanism 86 thus accounts for variation in the size of individual weights 16 and the compression of tape 20 to take up slack in tape 20 allowing tape divider 30 to cut tape 20 efficiently in dividing zone 84.

Bias mechanism 86 includes a body 90. Body 90 is pivotally coupled to frame 40 by a pivot pin 92 of mechanism 86. Pivot pin 92 provides a pivot axis 93 about which body 90 pivots. A washer 94 of mechanism 86 is positioned between a head of pin 92 and body 90. A first side 95 of body 90 includes a narrow bias surface 97 that contacts backing 22 to press the biased weight(s) 16a against end portion 88. First side 95 also includes a broader surface 99 recessed from bias surface 97 to minimize drag on backing 22 as backing 22 and weight 12 move past body 90.

Figure 6:
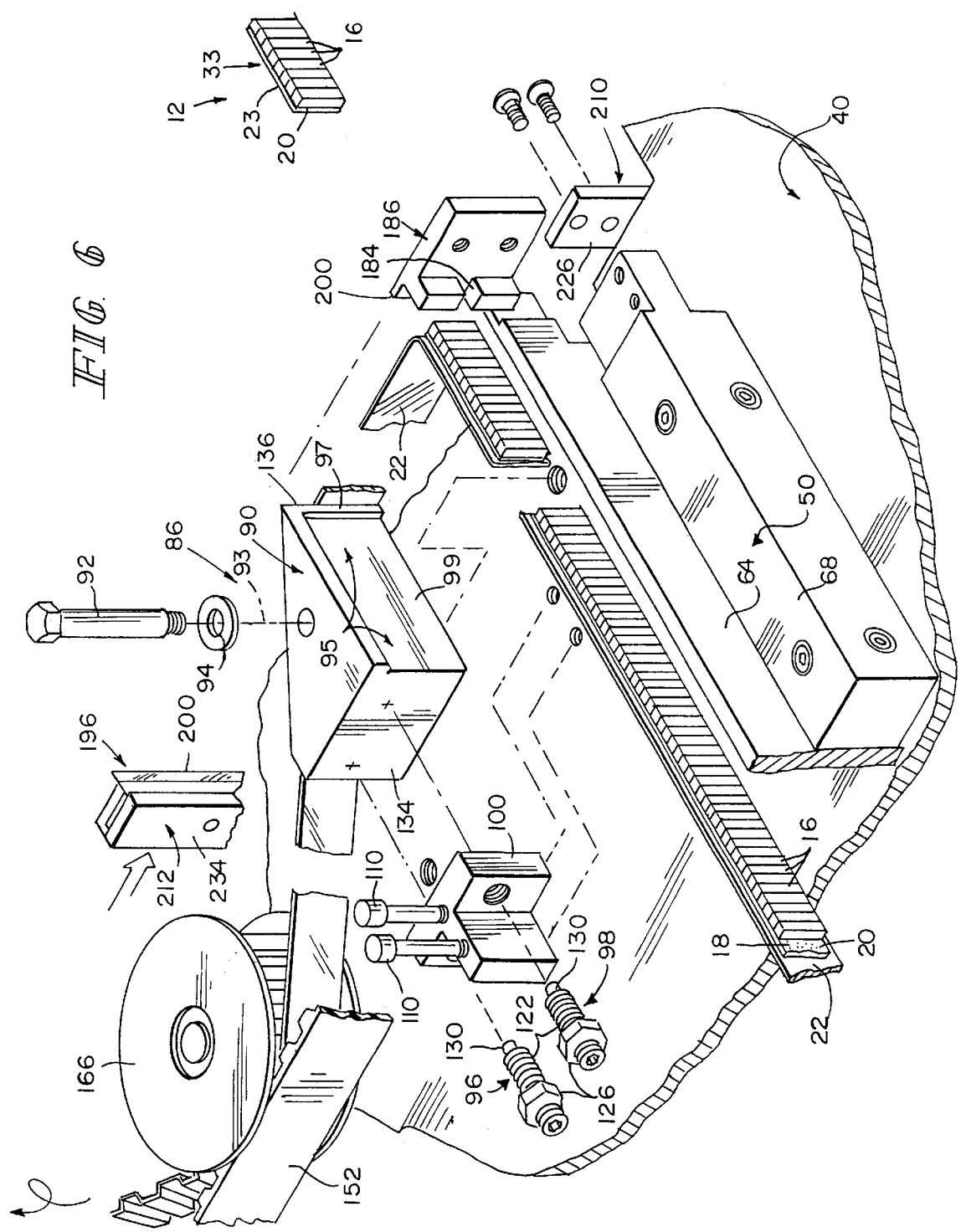
FIG. 6 illustrates an exploded fragmentary view of components of the weight dispenser system illustrated in FIG. 3.
Figure 7:
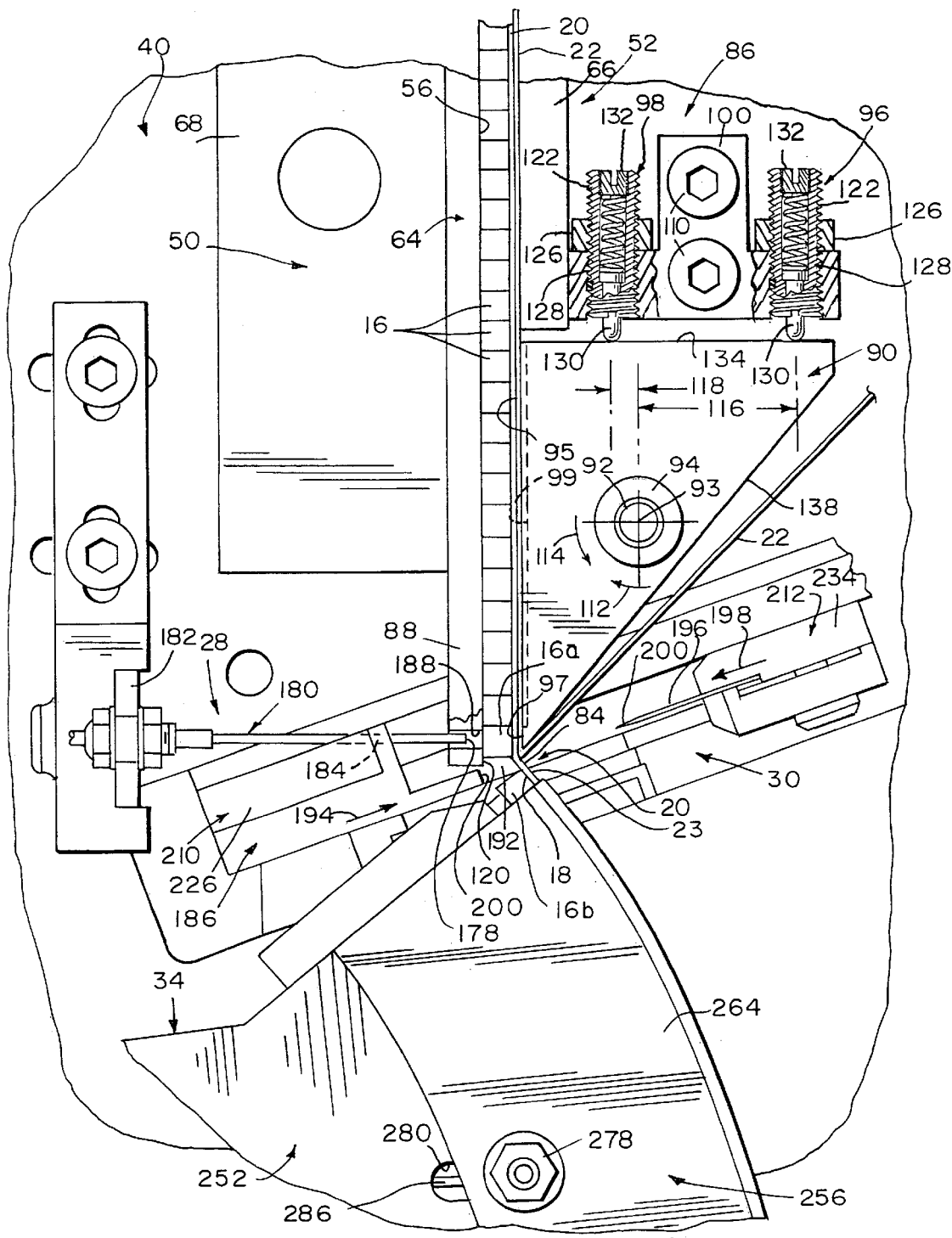
FIG. 7 illustrates a partly fragmentary top plan view of components of the apparatus illustrated in FIGS. 3 and 5 in a first orientation.

Mechanism 86 further includes a forward bias element 96 and a reverse bias element 98 which are coupled to a mount 100, as illustrated in FIGS. 5–7. Mount 100 is in turn coupled to frame 40 by couplers 110. Forward bias element 96 yieldably biases bias surface 97 in a first direction 112 (FIG. 7) toward end portion 88 whereas reverse bias element 98 yieldably biases bias surface 97 in a second direction 114 away from end portion 88. Forward bias element 96 is positioned a first effective distance 116 away from pivot axis 93. Reverse bias element 98 is positioned a second effective distance 118 away from pivot axis 93. Distance 116 is greater than distance 118 so that element 96 causes body 90 to pivot in direction 112 against a biasing force of element 98 to narrow a gap 120 between body 90 and end portion 88 through which weight 12 and backing 22 pass. However, without element 98, element 96 would cause body 90 to close gap 120 between body 90 and end portion 88. It is desirable to avoid such gap closure to facilitate automatic introduction of weight 12 and backing 22 through channel 56 into dividing zone 84 when setting up system 10.

Bias elements 96, 98 are similar to one another in construction, as illustrated in FIG. 7. Thus, the description of the construction of element 96 applies also to the construction of element 98. Element 96 includes a threaded housing 122 that is threaded into a corresponding threaded aperture of mount 100. A nut 126 of element 96 is coupled to housing 122 to hold housing 122 in place. A spring 128 of element 96 is positioned within the barrel of housing 122 to urge a plunger 130 of element 96 to the maximum projection from housing 122 permitted by engagement of a head of plunger 130 with a shoulder provided in the barrel. A set screw 132 of element 96 is provided to capture spring 128 within the barrel. A tip of plunger 130 is positioned outside the barrel to engage a second surface 134 of body 90. Plunger 130 moves within barrel as body 90 pivots in response to variations in the size of weights 16 and the compression of tape 20 and backing 22.

Backing 22 is peeled away from tape 20 and pulled around a corner 136 of body 90, as illustrated in FIG. 6. Bias surface 97 and a side 138 of body 90 cooperate to provide corner 136. Corner 136 defines an angle of, for example, about 40°.

After being peeled away from tape 20, backing 22 encounters an inlet guide 139, as illustrated in FIGS. 3 and 5. Inlet guide 139 maintains backing 22 in registry with driver 49. Inlet guide 139 includes a raised platform 140 mounted on frame 40, a first side member 142, a second side member 144, and an upper member 146, all of which cooperate to provide an inlet opening 148 through which backing 22 passes. Members 142, 144, 146 are mounted to a cover 150 which covers components of driver 49.

Driver 49 pulls backing 22 from tape 20 through inlet opening 148, as illustrated in FIG. 5. Referring to FIGS. 1, 3 and 5, driver 49 includes a belt 152, a pulley system 154 around which belt 152 is trained, a motor 156 to rotate a drive pulley 158 of pulley system 154, and a clutch-and-brake mechanism 160 coupled to motor 156 and drive pulley 158 to control movement of backing 22 and thus weight 12 in response to feeder signal 36, as illustrated in FIG. 1. Pulley system 154 further includes first 162, second 164, and third 166 idler pulleys. Pulleys 158, 162, 164, 166 are rotatably mounted from frame 40. Belt 152 is trained about drive pulley 158 and idler pulleys 162, 164 to advance backing 22 as backing 22 passes between the intermeshing teeth of belt 152 and third idler pulley 166. The teeth of belt 152 and third idler pulley 166 help grip backing 22 which may be somewhat slick-surfaced. After passing driver 49, backing 22 is directed through an outlet guide 168 and into collection container 42.

To facilitate loading of backing 22 between belt 152 and third idler pulley 166, third idler pulley 166 is mounted on a retractable loader 170, as illustrated in FIGS. 3 and 5. Loader 170 includes arm 172 pivotally coupled to frame 40 at one end and a handle 174 coupled to the other end of arm 172. A spring 176 has one end coupled to frame 40 and another end coupled to arm 172 to bias third idler pulley 166 normally to an engaged position (see FIG. 5) in which third idler pulley 166 engages belt 152. A machine operator can retract third idler pulley 166 away from belt 152 to a disengaged position (see FIG. 3) to facilitate threading of backing 22 between belt 152 and third idler pulley 166.

Figure 8:
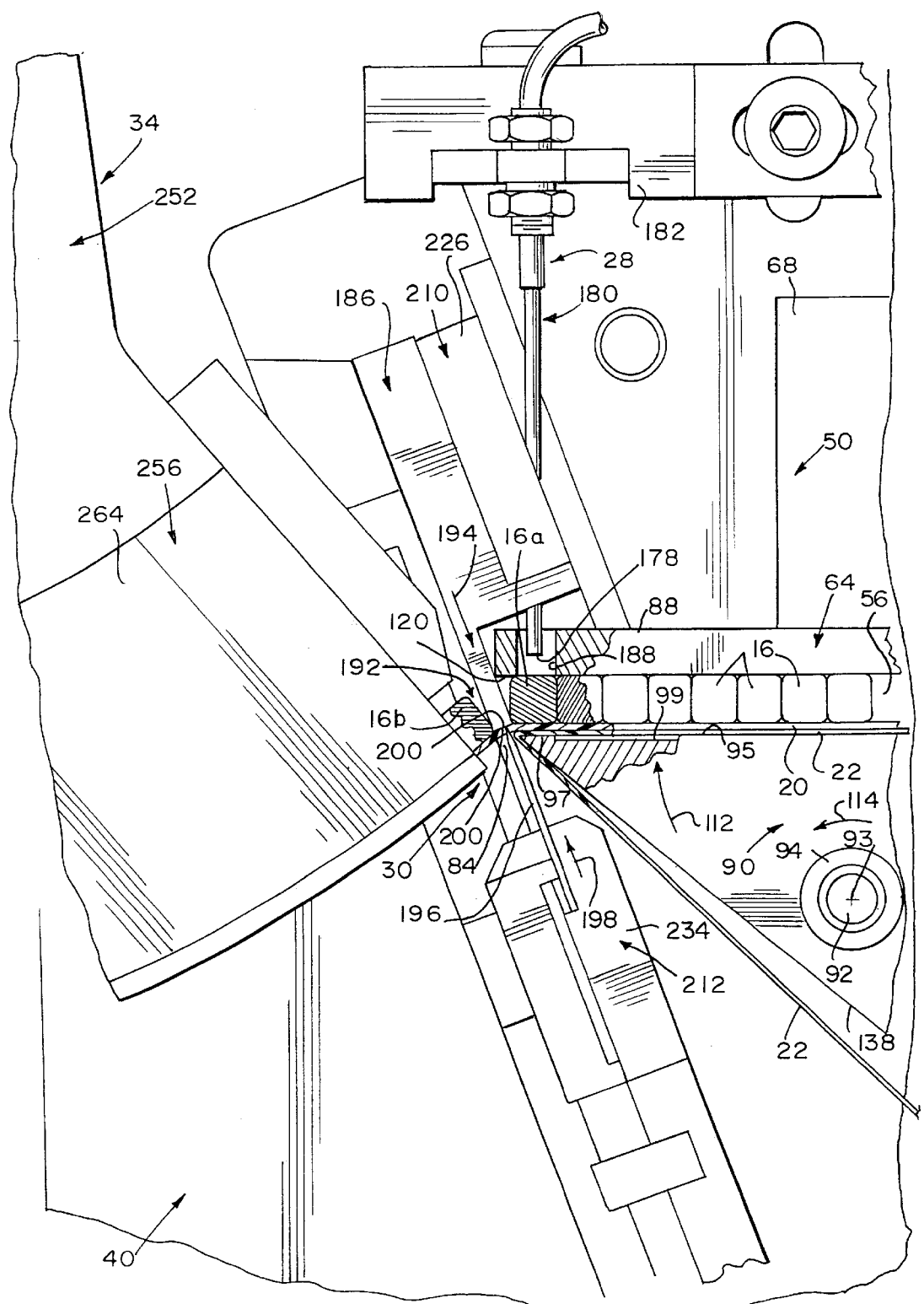
FIG. 8 illustrates a partly fragmentary top plan view of components of the apparatus illustrated in FIGS. 3, 5 and 7 in a second orientation.

Sensor 28 includes a sensor for counting individual weights 16 that pass it, as illustrated in FIGS. 5, 7, and 8. It does so, for example, by directing a beam of light in the direction of a space through which each weight 16 passes, detecting each weight 16 as it passes through that space, and sending counter signals 35 indicative of each detected weight 16 to controller 25. The light beam originates from a light source (not shown) contained within box 39 and passes through a lens 178 (FIGS. 7 and 8) of a head 180 which is coupled by a mount 182 to frame 40. Head 180 extends through a slot 184 in an anvil 186 of divider 30 and into a slot 188 of end portion 88 so that lens 178 is positioned close to the biased weight 16a which will be dispensed next.

After passing lens 178 and bias surface 97, weight 12 exits from channel 56 and advances through dividing zone 84 into a channel 190 of applicator 34 as backing 22 is pulled from tape 20, as illustrated in FIGS. 5, 7, and 8. Upon exiting channel 56, weight 12 is pulled around corner 136 so that it diverts from its straight path in channel 56. A dividing gap 192 is thus provided in dividing zone 84 between the current biased weight 16a, which is positioned within channel 56, and the next adjacent downstream weight 16b, which is positioned at least partially within channel 190. Dividing gap 192 exposes a portion of tape 20 to anvil 186 to facilitate dividing of tape 20, which is explained in more detail below.

Once sensor 28 has counted the desired number of weights 16, controller 25 stops weight 12. Controller 25 stops movement of weight 12 by sending feeder signal 36 to driver 49 which opens the clutch of mechanism 160 and causes mechanism 160 to brake movement of pulley system 154, backing 22 and thus weight 12. This stoppage of weight 12 "freezes" the current dividing gap 192 provided between the current biased weight 16a and the current next adjacent downstream weight 16b.

Referring to FIGS. 1, 3, and 5–11, after stopping movement of weight 12, controller sends divider signal 38 to divider 30 to cause divider 30 to cut tape 20. Upon receiving divider signal 38, an actuator 193 (FIGS. 9–10) drives anvil 186 and a blade 196 of divider 30 to cut tape 20. Anvil 186 moves first during an anvil-moving stroke and blade 196 moves second during a blade-moving stroke. During the anvil-moving stroke, anvil 186 advances in a direction 194 into dividing gap 192. As anvil 186 advances into dividing gap 192, it enters and widens gap 192, reducing the likelihood that blade 196 will impact either weight 16a or 16b. This increases the likelihood that the protective coatings on weights 16a, 16b will remain intact and avoid exposure to the material of weights 16a, 16b. As anvil 186 contacts weight 16b, it pushes weight 16b into channel 190 of applicator 34. Anvil 186 also contacts the first side 18 of tape 20 when it enters gap 192. Anvil 186 thus moves from a tape-disengaging position (see FIGS. 7 and 9) to a tape-engaging position (see FIGS. 5, 8, and 10) during the anvil-moving stroke.

Once anvil 186 contacts tape 20, the blade-moving stroke begins. During the blade-moving stroke, blade 196 approaches tape 20 from second side 20 in a direction 198 and slices through tape 20 and into contact with anvil 186. Blade 196 thus moves from a non-dividing position away from anvil 186 and tape 20 (see FIGS. 3, 7, and 9) to a dividing position (see FIGS. 5, 8, and 10) engaging anvil 186 and tape 20 during the blade-moving stroke. Anvil 186 is made of a somewhat malleable material, such as brass or aluminum, so that blade 196 cuts all the way through tape 20 even if a blade-engaging surface 200 of anvil 186 has some irregularities. A protective blade guard 202 (FIG. 3) mounted to frame 40 partially covers blade 196 as blade 196 moves during the blade-moving stroke.

Divider 30 and guide 48 are arranged at an oblique angle to one another, as illustrated in FIGS. 5, 7, and 8. Anvil 186 and blade 196 move along a straight path which is disposed at the oblique angle with a straight path of channel 56 of guide 48. Divider 30 and guide 48 are arranged in this manner so that gap 192 opens up between weights 16a, 16b for the entry of anvil 186 during the anvil-moving stroke.

Referring to FIGS. 9–11, actuator 193 includes an anvil carriage 210 for carrying anvil 186, a blade carriage 212 for carrying blade 196, a fluid motor 214 coupled to both carriages 210, 212, and a valve 216 electrically coupled to controller 25 to receive divider signal 38 and in fluid communication with fluid motor 214 to activate fluid motor 214. Carriages 210, 212 are mounted on supports 218 of frame 40 for sliding movement relative to one another. Each carriage 210, 212 includes a pair of elongated slots 220 for receiving respective supports 218. Fluid motor 214 includes a fluid cylinder 222 and a rod 224 which extends from and retracts into cylinder 222. Fluid cylinder 222 is mounted to anvil carriage 210, and rod 224 is mounted to blade carriage 212. Anvil carriage 210 includes an anvil tongue 226, a cylinder tongue 228, and a stop tongue 230. Anvil 186 is mounted to anvil tongue 226. Cylinder 222 is mounted to cylinder tongue 228. Blade carriage 212 includes a blade tongue 234 and a rod tongue 236. Blade 196 is coupled to blade tongue 234. Rod 224 is coupled to rod tongue 236.

Divider 30 further includes a sequencer 237 for sequencing the movement of anvil 186 and blade 196 relative to frame 40 so that anvil 186 moves first during the anvil-moving stroke and blade 196 moves second during the blade-moving stroke. Sequencer 237 includes an adjustable stop 238 and a spring 240, as illustrated in FIGS. 3, 5, 9, and 10. Spring 240 is coupled to frame 40 at one end and to blade carriage 212 at its other end to bias blade 196 to its non-dividing position away from anvil 186. Stop 238 includes a body 242 mounted to frame 40 and has a pair of spaced-apart ears 244 that define a space 246 therebetween. Stop tongue 230 extends upwardly into space 246. Stopper 238 further includes a pair of threaded adjustable members 248a and 248b, one for each ear 244. Member 248a engages stop tongue 230 to position anvil 186 before the anvil-moving stroke. Member 248b engages stop tongue 230 to end the anvil-moving stroke. Adjustment of either member 248a, 248b adjusts the excursion 250 of anvil 186.

During the anvil-moving stroke, cylinder 222 moves anvil carriage 210 and anvil 186 the distance 250 in direction 194 while blade carriage 212 and blade 196 remain stationary due to a biasing force applied to blade carriage 212 by spring 240, as illustrated in FIG. 9. Members 248a, 248b are adjusted so that anvil 186 contacts first side 18 of tape 20 during the anvil-moving stroke.

After stop tongue 230 engages member 248b, fluid motor 214 overcomes the biasing force applied to blade carriage 212 by spring 240 and rod 224 moves blade carriage 212 and blade 196 in direction 196 so that blade 196 cuts through tape 20, as illustrated in FIG. 10. Anvil carriage 210 and anvil 186 remain stationary during the blade-moving stroke due to engagement between member 248b and stop tongue 230.

The thus-cut amount 33 of weight 12 is loaded into curved channel 190 of applicator 34, as illustrated, for example, in FIGS. 5, 7, 8, and 12–15. A handle or body 252 is mounted on a pair of pegs 254 of frame 40 when channel 190 is being loaded (see FIGS. 3 and 5). A clamp 256 of applicator 34 provides channel 190. Clamp 256 is movable relative to body 252 between an extended, loading position (see FIGS. 5, 7, 8, 12, and 13) and a retracted, unloading position (see FIGS. 14 and 15). In the extended, loading position, second side 23 is positioned within channel 190 to reduce the likelihood of inadvertent contact between tape 20 and anything. In the retracted, unloading position, second side 23 is positioned outside of channel 190 to provide for contact with a concave surface 257 of rotary element 14. A pair of first bias mechanisms 258 of clamp 256 and a pair of second bias mechanisms 260 cooperate to yieldably bias clamp 256 toward the extended, loading position.

Clamp 256 includes two jaws 264 and the two first bias mechanisms 258 for biasing jaws 264 toward one another to the extended, loading position, as illustrated in FIGS. 12–15. Jaws 264 provide channel 190. Each jaw 264 includes a groove 268. Grooves 268 hold the amount 33 of weight 12 when clamp 256 is positioned in the extended, loading position, as illustrated in FIGS. 12 and 13. Each jaw 264 also includes an outer flange 270 for holding the amount 33 of weight 12 when clamp 256 is positioned in the retracted, unloading position, as illustrated in FIGS. 14 and 15. Each mechanism 258 includes a connector 272 extending through an aperture 274 in each jaw 264 and a pair of wave springs 276. Each wave spring 276 is captured between a head or nut 278 of the respective connector 272 and the respective jaw 264. Wave springs 276 cooperate to hold jaws 264 yieldably against the sides of body 252.

Body 252 includes a pair of slots 280 for connectors 272 and a pair of elongated bores 282 for second bias mechanisms 260, as illustrated in FIGS. 12–15. Each connector 272 extends through and is movable within one of slots 280 as clamp 256 moves between the extended, loading and retracted, unloading positions. Each second bias mechanism 260 is positioned within the respective bore 282 and includes a set screw 284 threaded to body 252, a plunger 286 coupled to the respective connector 272, and a coil spring 288 captured between the respective set screw 284 and plunger 286 to yieldably bias clamp 256 axially away from body 252 to the extended, loading position. Body 252 further includes a convex surface 290 for pressing the amount 33 of weight 12 onto concave surface 257 of rotary element 14.

Once the amount 33 of weight 12 is loaded into grooves 268 of channel 190, an operator can readily attach it to concave surface 257 of rotary element 14, as illustrated in FIGS. 12–14. The operator removes applicator 34 from pegs 254 and, while gripping body 252, presses convex surfaces 292 of jaws 264 against concave surface 257, as illustrated in FIGS. 12 and 13. Pressing surfaces 292 against surface 257 in this manner causes convex surface 290 of body 252 to press against weights 16 and jaws 264 to retract from the extended, loading position to the retracted, unloading position, exposing side 23 of tape 20 out of channel 190. The amount 33 of weight 12 thus moves out of grooves 268 and is held by outer flanges 270 in preparation for attachment to concave surface 257. The operator then rolls convex surfaces 292 of jaws 264 onto concave surface 257 in a direction 266, causing second side 23 to contact and attach to concave surface 257. The radii of curvature of convex surfaces 290, 292 are substantially the same but less than the radius of curvature of concave surface 257, allowing the operator to roll the amount 33 of weight 12 onto rotary element 14.

What is claimed is:

1. Apparatus for dispensing imbalance correction weight for attachment to a rotary element to reduce an imbalance in the rotary element, the imbalance correction weight including one or more individual weights provided on a length of tape, the apparatus including a blade and an anvil which cooperate to cut the tape, and a sequencer for sequencing relative movement of the blade and the anvil in a blade-moving stroke and an anvil-moving stroke, respectively.

2. The apparatus of claim 1 wherein the sequencer includes a spring for biasing the blade away from the anvil to sequence the anvil-moving stroke to occur before the blade-moving stroke.

3. The apparatus of claim 1 further including a blade carriage carrying the blade and an anvil carriage carrying the anvil, the blade carriage and the anvil carriage being mounted on a frame for relative movement.

4. The apparatus of claim 3 wherein the sequencer includes a stop for engaging the anvil carriage to end the anvil-moving stroke.

5. The apparatus of claim 4 wherein the stop includes a first adjustable member for adjusting the excursion of the anvil during the anvil-moving stroke.

6. The apparatus of claim 5 wherein the stop includes a second adjustable member engaging the anvil carriage to position the anvil before the anvil-moving stroke, the first adjustable member engaging the anvil carriage to end the anvil-moving stroke.

7. The apparatus of claim 4 wherein the sequencer includes a spring coupled to the blade carriage to bias the blade away from the anvil.

8. The apparatus of claim 3 wherein the sequencer includes a spring coupled to the blade carriage to bias the blade away from the anvil.

9. The apparatus of claim 3 including a motor coupled to the blade carriage and the anvil carriage for moving the blade during the blade-moving stroke and the anvil during the anvil-moving stroke.

10. The apparatus of claim 9 wherein the motor includes a cylinder and a rod extensible from the cylinder in response to fluid flow, the cylinder being coupled to one of the anvil carriage and the blade carriage, and the rod being coupled to the other of the anvil carriage and the blade carriage.

* * * * *